United States Patent Office 3,328,141
Patented June 27, 1967

3,328,141
PROCESS FOR POLISHING CRYSTALLINE SILICON
Raymond L. Lachapelle, Reading, Pa., assignor to Tizon Chemical Corporation, Flemington, N.J., a corporation of New Jersey
No Drawing. Filed Feb. 28, 1966, Ser. No. 530,347
14 Claims. (Cl. 51—307)

This application is a continuation-in-part of Ser. No. 421,077, filed Dec. 24, 1964 and now abandoned.

This invention relates to polishing compositions formulated especially for a rapid polishing of crystalline silicon to produce a smooth planar surface, and to process for polishing crystalline silicon employing aqueous slurries of such compositions, and more particularly, to silicon polishing compositions formulated to have a pH of at least about 10 when in aqueous form, and comprising a silicon polishing agent and an alkline compound and to a process for polishing silicon employing such compositions.

Monocrystalline silicon or single crystal silicon is now widely used in the manufacture of transistors and like equipment. The silicon crystal is prepared in ingot form. The ingots usually are rather large, of the order of ½ inch in diameter and 2 to 4½ inches long. The silicon is sliced from the ingot in very thin sheets having thickness of only several thousandths of an inch, and these sheets are then polished to produce as planar a surface as possible. It is important that the surface be absolutely plane and free from scratches, pits and like defects, since the conductivity of silicon is in the plane along its surface, and any surface defects disadvantageously affect the conductivity, and therefore the effectiveness of the device in which the silicon is used.

The polishing compositions in general use comprise a polishing agent for silicon such as cerium oxide, aluminum oxide, red rouge (ferric oxide), white rouge (silicon dioxide) or zirconium oxide, slurried in water. The polish is applied to the silicon surface, and the polishing effected with a polishing pad. The polishing agents now in use are, however, rather slow, and a considerable polishing time is required to smooth the surface. Moreover, some of the polishing agents, such as aluminum oxide, have a tendency to produce scratches, which can be rather deep, and the longer the polishing time required, the greater the tendency of the surface to acquire polishing defects of this type.

In accordance with the invention, it has been determined that if the polishing is carried out with an aqueous slurry of a polishing agent at a pH of at least about 10, the speed of polishing is greatly increased, and a better quality planar surface is produced, substantially free from polishing defects such as pits and scratches. The invention accordingly provides a polishing composition consisting essentially of a polishing agent for silicon, and an alkaline compound in an amount to ensure a pH of at least about 10 in the presence of the water employed as a suspending agent in the polishing composition.

The invention is applicable to the polishing of any silicon surface, but is especially adapted for the polishing of crystalline silicon or silicon monocrystals.

Any polishing agent which is useful in the polishing of silicon can be employed in the polishing compositions of the invention. Zirconium oxide, cerium oxide, aluminum oxide, silicon dioxide or white rouge, and ferric oxide or red rouge are useful. Commercial grades of these material containing minor proportions of other oxides as impurities can also be used, such as the commercial grades of cerium oxide, containing cerium oxide in admixture with other rare earth oxides, such as the commercial grades of cerium oxide containing cerium oxide in admixture with other rare earth oxides, such as thorium oxide, for example, Barnesite and Rare Ox.

Zirconium oxide is a preferred oxide because it is not only rapid, but gives a superior surface which is completely free from surface blemishes. Of the various crystal forms of zirconium oxide, the monoclinic form can be used as well as any of the various cubic forms, including the so-called stabilized cubic forms which are available. A preferred cubic form is that described and claimed in U.S. Patent No. 2,996,369, dated Aug. 15, 1961. Commercial grades of zirconium oxide polishing agents are available under the trademarks Lustrox, Vibrox and Zirox.

Alpha-aluminum oxide $\alpha$-$Al_2O_3$ as sold by Linde under the trademark Linde Type A can be used, and is a typical commercial grade of alumina.

With the polishing agent, there is combined an alkaline compound in an amount to ensure a pH of at least about 10 in the presence of water. There is no upper limit on pH, which can be as high as is obtainable with the alkaline compound used. Usually, the upper pH limit that is obtainable is about 13, but theoretically it can be as high as 14. However, pH values within the range from about 10.5 to about 12.5 are preferred, for optimum polishing rate (silicon removal) and surface characteristics.

The silicon polishing agents in the form in which they are available in commerce are essentially neutral compounds, and it is necessary to incorporate only a very small amount of alkaline compound to ensure a pH within this range. In fact, the use of excessive amounts of alkaline compound beyond that required to maintain such pH tends to soften the silicon surface during polishing to such an extent as to impair the quality of the surface. The amount of alkaline compound to achieve a given alkalinity will, of course, be dependent on the basicity of the compound, and upon the polishing agent. Some polishing agents are more effective at very high alkalinities than others. As an illustration, in the case of zirconium oxide, the amount of alkaline compound in the case of strong alkalis such as sodium hydroxide, potassium hydroxide, calcium hydroxide, barium hydroxide or lithium hydroxide, or strongly alkaline salts such as sodium carbonate, potassium carbonate, and lithium carbonate, is above about 0.05% but not usually in excess of about 100% by weight of the polishing agent. In the case of most polishing agents, however, there is no critical upper limit. The upper limit frequently can be as high as 1000%, without disadvantage. A practical polishing effectiveness for all polishing agents is obtained employing an amount within the range from about 0.5 to about 50%, beyond which an increase in polishing effectiveness may not always be commensurate with the larger amounts of alkaline compound required, and hence not economic. Consequently, amounts within this range are preferred.

As the alkaline compound, any compound sufficiently alkaline to ensure a pH in excess of about 10 can be used. The oxides and hydroxides of the alkali and alkaline earth metals are available and inexpensive, and are preferred. These include, in addition to those named above, calcium oxide, barium oxide, strontium oxide, magnesium oxide, magnesium hydroxide, and strontium hydroxide. Other strong metal hydroxides can be used, such as aluminum hydroxide. Strongly alkaline salts of the alkali and alkaline earth metals also can be used, including the carbonates, metaborates, tetraborates, triphosphates, pyrophosphates and tripolyphosphates, for example, in addition to those named above, sodium metaborate, trisodium orthophosphate, pentasodium tripolyphosphate, tetrasodium pyrophosphate, potassium metaphosphate, sodium tetraborate pentahydrate, sodium tetraborate decahydrate, sodium pentaborate, barium orthophosphate and lithium orthophosphate.

The compositions can be formulated as solid materials, the polishng agent and the alkaline compound being mixed or ground together to form a homogeneous mixture. The polishing agent should be in finely-divided form, not in excess of about 20 microns. Since the alkaline compound is normally dissolved in the water used, the particle size is not critical, but, of course, a particle that is rapidly dissolving in water is desirable. The compositions also can be formulated as aqueous slurries, and sold as such. The user of the composition will add water to solid compositions or may dilute the aqueous slurries to produce a polishing slurry of the desired concentration and consistency, usually of the order of from about 10 to about 50% polishing agent by weight of the slurry.

The polishing is carried out in the conventional way at room temperature by applying the aqueous slurried polishing composition to the silicon, and then polishing with a felt or other type of polishing pad. The so-called commercial bowl feed polisher is quite satisfactory, as are other commercially used or modified polishing or lapping machines. Water should be added from time to time to compensate for evaporation loss and maintain a constant concentration of polishing composition, but this is not essential.

The polishing agents can be used in admixture, and in many cases this may be advantageous. For example, mixtures of the monoclinic and cubic forms of zirconium oxide can be used, as well as mixtures of either of these forms of zirconium oxide with aluminum oxide, cerium oxide, white rouge or red rouge.

The following examples in the opinion of the inventor represent the preferred embodiments of his invention.

A standardized polishing test was used to evaluate the polishing effectiveness in the examples, carried out as follows. Various amounts of polishing composition to be evaluated, were thoroughly mixed in distilled water, and the pH of the so-formed slurry was measured. A weighed silicon disk was then polished for 10 minutes, using a standard commercial bowl feed polisher. Slurry was added during the test at a constant rate to maintain a concentration of polishing agent on the surface being polished and the polishing lap. At the end of the test, the silicon disk was weighed. In some cases, the test was repeated with new slurry for three additional test silicon wafers. The total weight loss in milligrams (mg.) for the single run test and for the four runs was then obtained, and averaged where applicable, as the measuring standard for polishing effectiveness of the composition. The equipment used in measuring pH of the polishing slurry was not capable of accurately measuring pH values of higher than 12.5. Accordingly, where the pH of the slurry was above 12.5, it is reported hereinafter as being 12.5 or higher, or above 12.5.

Example 1

A mixture was prepared by blending 50 grams of Lustrox M brand cubic zirconium oxide, with 1% sodium carbonate by weight of the cubic zirconium oxide. This mixture was slurried in 100 cc. of water, and the pH was noted to be 10.3. This material gave the following silicon polishing test results: 19.4, 20.2, 19.0, 18.5 mg. weight loss. The average of these values for the former was 19.3 mg. and for the latter 10.7 mg., so that the sodium carbonate in maintaining a pH of 10.3 effected an 80.3% increase in polishing effectiveness.

The surface of the silicon was examined for blemishes and scratches. The surface of the silicon polished with the alkaline zirconium oxide composition was absolutely smooth and scratch-free. The surface of the composition polished with the zirconium oxide alone was absolutely smooth, but had a few minor surface scratches.

Example 2

An aqueous slurry was prepared, composed of 33⅓% Lustrox M brand cubic zirconium oxide and 2 cc. of a 50% aqueous sodium hydroxide solution. This slurry had a pH of 12.5. When applied to the polishing of silicon in the standardized polishing test, the material gave the following results: 17.6, 18.7, 20.5, 20.7 mg. weight loss for an average mg. weight loss of 19.4. Comparing these values with the value for the same zirconium oxide alone as in Example 1 shows that sodium hydroxide gave an 80.3% increase in polishing effectiveness.

The surface of the silicon was examined, and found to be absolutely smooth and scratch-free.

Varying amounts of sodium hydroxide were added to aqueous slurries containing 33⅓% Lustrox M cubic zirconium oxide. The so-formed polishing compositions were used to polish silicon in the standardized test. Table I below shows the amount of sodium hydroxide used, the pH of the aqueous slurry of the polishing composition, the polishing effectiveness as evaluated by the standardized test, and the percent increase in polishing effectiveness of the resulting slurries over a slurry of Lustrox M alone, without sodium hydroxide.

TABLE I

| Run | Percent NaOH by weight Lustrox M ($ZrO_2$) | pH of slurry | Polishing effectiveness (mg.) | Percent increase in polishing effectiveness over Lustrox M alone, without NaOH |
|---|---|---|---|---|
| Control | 0 | 8.5 | 16.0 | |
| 1 | 10 | 12.15 | 25.9 | About 62. |
| 2 | 20 | 12.5 | 27.8 | About 74. |
| 3 | 30 | | 32.8 | About 100. |
| 4 | 40 | | 31.1 | About 95. |
| 5 | 60 | 12.5 or higher | 41.5 | About 150. |
| 6 | 80 | | 52.1 | About 225. |
| 7 | 100 | | 56.7 | About 250. |
| 8 | 200 | | 39.4 | About 145. |
| 9 | 1,000 | | 24.7 | About 54. |

Example 3

Aqueous slurries of silicon polishing composition were prepared by blending 200 grams of Lustrox LE brand, slurried zirconium oxide, with varying amounts of sodium hydroxide and 100 cc. of water. The polishing compositions were used to polish silicon in the standardized test. Table II below shows the amount of sodium hydroxide used in each polishing composition, the pH thereof, the polishing effectiveness as evaluated by the standardized test, and the percent increase in polishing effectiveness of the resulting slurries over a slurry of Lustrox LE alone, without sodium hydroxide.

TABLE II

| Run | Percent NaOH by weight Lustrox LE | pH of slurry | Polishing effectiveness (mg.) | Percent increase in polishing effectiveness over Lustrox LE alone, without NaOH |
|---|---|---|---|---|
| Control | 0 | 7.0 | 9.8 | |
| 1 | 1 | 12.25 | 11.8 | About 20. |
| 2 | 5 | 12.4 | 11.2 | About 14. |
| 3 | 10 | | 16.6 | About 70. |
| 4 | 50 | Above 12.5 | 36.5 | About 270. |
| 5 | 100 | | 55.0 | About 460. |

Example 4

Aqueous slurries were prepared composed of 33⅓% Luxtrox LW brand milled slurried zirconium oxide and varying amounts of sodium carbonate. The polishing compositions thereby produced were used to polish silicon. The amount of sodium hydroxide employed in and the pH of each slurry, the polishing effectiveness, and percent increase in polishing effectiveness of the resulting slurries over a slurry of Lustrox LW alone, without the sodium carbonate are set forth in Table III below.

TABLE III

| Run | Percent Na₂CO₃ by weight ZrO₂ | pH | Polishing effectiveness (mg.) | Percent increase in polishing effectiveness over ZrO₂ alone, without Na₂CO₃ |
|---|---|---|---|---|
| Control | 0 | 8.3 | 12.0 | |
| 1 | 1 | 10.1 | 16.3 | About 36. |
| 2 | 2 | 10.5 | 14.2 | About 18.5. |
| 3 | 4 | 10.6 | 13.1 | About 9.2. |
| 4 | 6 | 10.7 | 15.6 | About 30. |
| 5 | 10 | 10.7 | 17.8 | About 49. |
| 6 | 20 | 10.8 | 23.2 | About 94. |
| 7 | 30 | 10.85 | 22.7 | About 89. |
| 8 | 50 | 10.85 | 23.3 | About 94. |
| 9 | 75 | 10.9 | 22.9 | About 91. |
| 10 | 100 | 10.85 | 26.1 | About 117. |

*Example 5*

A polishing composition was prepared composed of finely-divided alpha aluminum oxide, $\alpha$-Al$_2$O$_3$, as sold by Linde under the trademark Linde Type A for polishing silicon combined with 2% potassium carbonate by weight. 50 grams of the composition was slurried in 100 cc. of water, to form a polishing slurry of pH 10.4, and used to polish silicon in the standardized test, in which test it gave a weight loss of 10.3, 9.9, 9.9, 10.4 mg. for an average of 10.1 mg. A slurry was prepared composed of aluminum oxide alone, and subjected to the same test, with the result: 8.6, 6.6, 7.7, 8.3 mg. weight loss for an average of 7.8 mg. weight loss. The potassium carbonate thus improved the polishing effectiveness of the alumina by 29.5%.

The surfaces were examined for scratches and blemishes. The surface of the silicon polished with the alumina alone had serious scratches, whereas the surface of the silicon polished with the alkaline alumina polishing composition was relatively free from scratches.

In another series of runs, 60 grams of the aluminum oxide was slurried in 240 cc. of water along with varying amounts of sodium hydroxide. The amount of sodium hydroxide employed in and the pH of each slurry, the polishing effectiveness, and percent increase in polishing effectiveness of the resulting slurries over a slurry of aluminum oxide alone, without sodium hydroxide, are set forth in Table IV below.

TABLE IV

| Run | Percent NaOH by weight Al₂O₃ | pH | Polishing effectiveness (mg.) | Percent increase in polishing effectiveness over Al₂O₃ alone, without NaOH |
|---|---|---|---|---|
| Control | 0 | 9.0 | 8.3 | |
| 1 | 1 | 12.5 | 11.6 | About 40. |
| 2 | 5 | Above 12.5 | 14.0 | About 69. |
| 3 | 10 | Above 12.5 | 13.6 | About 64. |
| 4 | 50 | Above 12.5 | 20.0 | About 140. |

*Example 6*

A composition was prepared blending red rouge, Fe$_2$O$_3$, with 1% by weight of sodium carbonate. 50 grams of this composition when slurried in 100 cc. of water gave a pH of 10.4. This composition when used to polish silicon in the standardized test gave the following results: 12.3, 11.9, 12.0, 12.5 mg. weight loss. A slurry was prepared composed of 33⅓% red rouge without the sodium carbonate, and found to give 9.3, 9.8, 9.0, 9.0 mg. weight loss, for an average of 9.3 mg. weight loss in the test. Thus, the sodium carbonate enhanced the polishing effectivenes by 31.2%.

The surfaces of the silicon were found to be slightly scratched, improved over the unmodified red rouge slurry.

*Example 7*

100 grams of red rouge, Fe$_2$O$_3$, was slurried in 200 grams of water along with varying amounts of sodium hydroxide. The polishing compositions thereby produced were used to polish silicon. The amount of sodium hydroxide employed in and the pH of each slurry, the polishing effectiveness as seen from the results of the standardized test, and percent increase in polishing effectiveness of the resulting slurries over a slurry of red rouge alone, without sodium hydroxide, are set forth in Table V below.

TABLE V

| Run | Percent NaOH by weight Fe₂O₃ | pH | Polishing effectiveness (mg.) | Percent increase in polishing effectiveness over Fe₂O₃ alone, without NaOH |
|---|---|---|---|---|
| Control | | 6.3 | 7.5 | |
| 1 | 2 | 12.5 | 12 | 60 |
| 2 | 5 | 12.5 | 12 | 60 |

*Example 8*

A composition was prepared blending white rouge, SiO$_2$, with 20% by weight of sodium hydroxide. 120 grams of this composition when slurried in 200 cc. of water gave a pH of 12.5. This composition when used to polish silicon in the standardized test resulted in a weight loss of 59.2 mg.

A slurry was prepared composed of 33⅓% white rouge without the sodium hydroxide, had a pH of 5.75, and when used to polish silicon in the standardized test was found to give a weight loss of 48.1 mg. Thus, the sodium hydroxide enhanced the polishing effectiveness by about 23%.

*Example 9*

A series of polishing compositions were prepared wherein 100 grams of cerium oxide was slurried in 200 grams of water along with varying amounts of sodium hydroxide. These polishing compositions were used to polish silicon in the standardized test. The amount of sodium hydroxide employed in and the pH of each slurry, the polishing effectiveness, as seen from the standardized test results, and percent increase in polishing effectiveness of the resulting slurries over a slurry of cerium oxide alone, without sodium hydroxide, are set forth in Table VI below.

TABLE VI

| Run | Percent NaOH by weight CeO₂ | pH | Polishing effectiveness (mg.) | Percent increase in polishing effectiveness over CeO₂ alone, without NaOH |
|---|---|---|---|---|
| Control | 0 | 9.5 | 15.5 | |
| 1 | 5 | 12.5 | 18.6 | About 20. |
| 2 | 10 | above 12.5 | 28.1 | About 81. |
| 3 | 50 | above 12.5 | 30.5 | About 97. |

*Example 10*

A composition was prepared blending Lustrox M brand cubic zirconium oxide with 10% by weight calcium hydroxide. 110 grams of this composition when slurried in 200 grams of water gave a pH of 12.3. This composition, when used to polish silicon in the standardized tests gave a weight loss of 26.8 mg.

A slurry composed of 33⅓% Lustrox M without the calcium hydroxide, having a pH of about 8.5, was tested as a polishing composition for silicon in the standardized test under the same conditions as when the calcium hydroxide was added to the polishing composition. Such alkaline free slurry gave a weight loss of 16 mg. in the standardized test. Thus, the calcium hydroxide enhanced the polishing effectiveness by 55%.

Example 11

Aqueous slurries were prepared composed of 33⅓% of various commercial brands of zirconium oxide polishing compounds and varying quantities of sodium hydroxide. The polishing compounds thereby produced were used to polish silicon. The amount of sodium hydroxide employed in and the pH of each slurry of each commercial brand of zirconium oxide, the polishing effectiveness, and percent increase in polishing effectiveness of the resulting slurries over a slurry of each brand of zirconium oxide without the sodium hydroxide, are set forth in Table VII below.

TABLE VII

| Commercial brand of Zirconium Oxide | Run | Percent NaOH | pH | Polishing effectiveness (mg.) | Percent increase in polishing effectiveness over the commercial brand of zirconium oxide alone, without NaOH |
|---|---|---|---|---|---|
| No. 1 | Control | 0 | 5.6 | 8.5 | |
|  | 1 | 10 | 11.8 | 18.3 | About 115. |
|  | 2 | 50 | 12.5 | 31.6 | About 270. |
| No. 2 | Control | 0 | 7.5 | 11.9 | |
|  | 1 | 10 | above 12.5 | 20.4 | About 71. |
|  | 2 | 50 | above 12.5 | 22.8 | About 92. |
| No. 3 | Control | 0 | 9.1 | 13.0 | |
|  | 1 | 10 | above 12.5 | 21.4 | About 65. |
|  | 2 | 50 | above 12.5 | 28.0 | About 115. |
| No. 4 | Control | 0 | 8.9 | 12.3 | |
|  | 1 | 10 | above 12.5 | 21.5 | About 75. |
|  | 2 | 50 | above 12.5 | 28.4 | About 130. |

Having regard to the foregoing disclosure, the following is claimed as the inventive and patentable embodiments thereof:

1. A process for polishing crystalline silicon, which comprises applying to the surface of the silicon a composition consisting essentially of a polishing compound for silicon having a particle size of not more than about 20 microns, water in an amount to form a polishing slurry, and an inorganic alkaline compound in an amount within the range from about 0.05 to about 1000% by weight of the polishing compound to bring the pH to at least about 10 and increase the polishing effectiveness of the polishing compound; and polishing the silicon surface with the composition.

2. A process in accordance with claim 1 in which the alkaline compound is used in an amount to maintain the pH within the range from about 10.5 to about 12.5.

3. A process in accordance with claim 1 in which the polishing compound for silicon is zirconium oxide.

4. A process in accordance with claim 1 in which the polishing compound for silicon is cerium oxide.

5. A process in accordance with claim 1 in which the polishing compound for silicon is aluminum oxide.

6. A process in accordance with claim 1 in which the polishing compound for silicon is ferric oxide.

7. A process in accordance with claim 1 in which the polishing compound for silicon is silicon dioxide.

8. A process in accordance with claim 1 in which the polishing compound for silicon is cerium oxide in admixture with another rare earth oxide.

9. A process in accordance with claim 1 in which the alkaline compound is an alkali metal hydroxide.

10. A process in accordance with claim 9 wherein the alkali metal hydroxide is sodium hydroxide.

11. A process in accordance with claim 1 in which the alkaline compound is an alkali metal carbonate.

12. A process in accordance with claim 11 wherein the alkali metal carbonate is sodium carbonate.

13. A process in accordance with claim 1 in which the alkaline compound is an alkaline earth metal hydroxide.

14. A process in accordance with claim 13 wherein the alkaline earth metal hydroxide is calcium hydroxide.

References Cited

UNITED STATES PATENTS

| | | | |
|---|---|---|---|
| 2,193,965 | 3/1940 | Hochwalt | 51—307 |
| 2,383,500 | 8/1945 | Polan | 51—309 |
| 3,060,098 | 10/1962 | Gershon | 51—309 |
| 3,097,083 | 7/1963 | Silvernail | 51—309 |
| 3,123,452 | 3/1964 | Harris et al. | 51—309 |
| 3,222,148 | 12/1965 | Hay | 51—309 |

ALEXANDER H. BRODMERKEL, *Primary Examiner.*

D. J. ARNOLD, *Assistant Examiner.*

UNITED STATES PATENT OFFICE

CERTIFICATE OF CORRECTION

Patent No. 3,328,141                           June 27, 1967

Raymond L. Lachapelle

It is hereby certified that error appears in the above numbered patent requiring correction and that the said Letters Patent should read as corrected below.

Column 1, line 26, for "thickness" read -- thicknesses --; column 3, line 62, after "loss." insert -- The cubic zirconium oxide alone without the alkali gave the following results: 10.2, 10.3, 10.0, 12.3 mg. weight loss. --; column 4, TABLE I, fourth column, line 4 thereof, for "32.8" read -- 32.4 --.

Signed and sealed this 24th day of September 1968.

(SEAL)

Attest:

Edward M. Fletcher, Jr.                        EDWARD J. BRENNER

Attesting Officer                             Commissioner of Patents